United States Patent
Tsuruta

[11] Patent Number: 6,100,681
[45] Date of Patent: Aug. 8, 2000

[54] LINEAR ENCODING DEVICE WITH STAGGERED DETECTORS

[75] Inventor: Naohito Tsuruta, Gifu, Japan

[73] Assignee: Nippon Thompson Co. Ltd., Tokyo, Japan

[21] Appl. No.: 09/127,904

[22] Filed: Aug. 3, 1998

[30] Foreign Application Priority Data

Aug. 6, 1997 [JP] Japan .................................. 9-224209

[51] Int. Cl.[7] ................. G01B 7/14; G01P 3/50; F16C 29/00; H02K 41/02
[52] U.S. Cl. ................. 324/207.2; 324/207.24; 324/173; 310/12; 318/135; 341/15
[58] Field of Search .................... 324/207.2, 207.21, 324/207.24, 165, 173, 174; 310/12; 318/135; 341/15

[56] References Cited

U.S. PATENT DOCUMENTS 4,361,835  11/1982  Nagy ........................... 324/207.2 X
5,043,660  8/1991  Hasegawa ........................ 324/207.21
5,606,256  2/1997  Takei .

FOREIGN PATENT DOCUMENTS 0591113   4/1994  European Pat. Off. ............ 324/207.2
5-340426  12/1993  Japan .

*Primary Examiner*—Gerard Strecker
*Attorney, Agent, or Firm*—Browdy and Neimark, P.L.L.C.

[57] ABSTRACT

Onto a long rectangular board like base board, first Hall IC's are mounted at specified equal pitches in the longitudinal direction, and second Hall IC's are mounted at the equal pitches from a position shifted by a phase difference of 90 degrees in the longitudinal direction relative to this first Hall IC, and a single rectangular board like field magnet (12) having a length of a half of the equal pitch is mounted, opposite to the first Hall IC's and the second hole IC's, and consequently, a linear encoding device is provided, by which a long positional measurement can be performed, and further, which has a simple arrangement.

4 Claims, 5 Drawing Sheets

LINEAR ENCODING DEVICE WITH STAGGERED DETECTORS

BACKGROUND OF THE INVENTION

1. Field of the Invention

The present invention relates to a linear encoding device which is used in a mechanical part performing a relative motion, for example, a machine tool, an industrial robot, and the like to perform a positional detection, and especially relates to a linear encoding device by which a long positional measurement can be performed and which is most suitable for being mounted on a long and high speed guiding device, and further which has a simple arrangement.

2. Description of the Prior Art

As a linear encoding device of the prior art, for example, there is a device disclosed in Japanese Patent Application Laid-Open NO. 5-340426. FIG. 1 is an explanation figure of the enlarged principal part of the linear encoding device of the prior art.

As shown in FIG. 1, this linear encoding device comprises a permanent magnet 1 which is a detected element on the movable side attached to a table (not shown in the figure) and moving in the longitudinal direction A, and magnetism electricity converting elements 2 which are detecting elements on the fixed side. The permanent magnet 1 comprises 8 poles of magnetizing where S poles and N poles are alternately arranged in the direction of movement shown by the arrow A. The magnetism electricity converting elements 2 are mounted in a line at specified intervals on a base board 3 on the fixed side, facing the permanent magnet 1.

The detection of the position and the detection of the direction by this linear encoding device are performed such that when the permanent magnet 1 moves in the direction shown by the arrow A, the resistance value of a magnetism electricity converting element 2 corresponding to the permanent magnet 1, changes with the change of the magnetic field, and in turn, the change of the magnetic field arises in the adjacent magnetism electricity converting element 2, and the similar changes of the resistance continue, and consequently, these changes of the resistance value are detected. Furthermore, the change of the resistance value becomes an output signal corresponding to the number of poles of the permanent magnet 1 in each magnetism electricity converting element 2, since the permanent magnet 1 is multipolarized and magnetized, and in this case, it comprises 8 poles of magnetizing. In this case, the change of the resistance value becomes an output signal of 4 cycles, since a signal of N pole and a signal of S pole are alternately output.

In this linear encoding device, $$M = P - t$$

where the total length of the permanent magnet 1 in the direction A of movement is M, the arrangement pitch of each magnetic pole (N, S) of the permanent magnet 1 is t, and the arrangement pitch of each magnetism electricity converting element 2 is P.

A linear encoding device of the prior art has such an advantage that the magnetism electricity converting element 2 is mounted on the base board 3 which is the fixed side, and the detection signal can also be obtained from the fixed side, and therefore, the connection cable for the processing of the signal from the movable side is unnecessary, and the connection cable is not trailed. However, since the output signal of the magnetism electricity converting element 2 is made to be an analog sine wave signal corresponding to the multi-polarized and magnetized permanent magnet 1, there is such a problem that for processing this sine wave signal, signal processing circuits such as an amplifier circuit or an arithmetic processing circuit are necessary so that the control device may become complex.

Furthermore, as shown in FIG. 1, a linear encoding device of the prior art has such a problem that the gap g between the permanent magnet 1 and the magnetism electricity converting element 2 should be small, and further, the fluctuation of the gap g should also be small, that is, the gap should be set to a gap of approximately 70 μm±10 μm. The reason is that the pitch t of the magnetic poles of the permanent magnet 1 is a fine pitch, and therefore, if the gap g is large, the discrimination of the adjacent magnetic poles of the permanent magnet 1 becomes unclear, and the detecting ability of the magnetism electricity converting element 2 cannot perform a detection with a high accuracy.

Furthermore, in a linear encoding device of the prior art, the pitch t of the magnetic poles of the permanent magnet 1 is fine, and the discrimination power is also highly accurate, but there is such a problem that to make the operation faster is difficult. The reason is that similarly to the above mentioned problem of complexity, the processing capacity for the signal processing of the analog sine wave signal from the magnetism electricity converting element 2 by the signal processing circuit, is large, and the signal processing in a short time is difficult.

SUMMARY OF THE INVENTION

An object of the present invention is to provide a linear encoding device by which a long positional measurement can be performed, and which is most suitable for being mounted on a long and high speed guiding device, and further, which has a simple arrangement.

The present invention is a linear encoding device of a guiding device comprising a long base stand and a table slidably guided along the longitudinal direction of the base stand, which comprises a detected element mounted on the table and a detecting element mounted on the base stand, and the detecting element includes a plurality of Hall IC's, and the Hall IC's include first Hall IC's arranged at equal pitches in the longitudinal direction and second Hall IC's arranged at the equal pitches in the same line or in parallel with the first Hall IC's from a position shifted by a quarter of the pitch which makes a phase difference of 90 degrees from the first Hall IC in the longitudinal direction, and the detected element includes a rectangular board like field magnet of a single magnetic pole having a length of a half of the pitch which makes a phase of 180 degrees, opposite to the Hall IC, and the Hall IC detects the field magnet so that the output signals of phase A and phase B may be output.

Furthermore, the Hall IC is mounted onto the base stand through a base board.

Furthermore, the pitch has a size suitable for the service objects, and it has a specified size approximately from 8 mm to 40 mm.

Furthermore, the guiding device is a linear motor table comprising a long rectangular board like bed, a slidable table guided by a linear motion rolling guiding unit along the longitudinal direction of the bed, and a movable magnet type linear electromagnetic actuator which drives the table relative to the bed in such a way that sliding and positioning are free.

DESCRIPTION OF THE PREFERRED EMBODIMENTS

Figure 1:
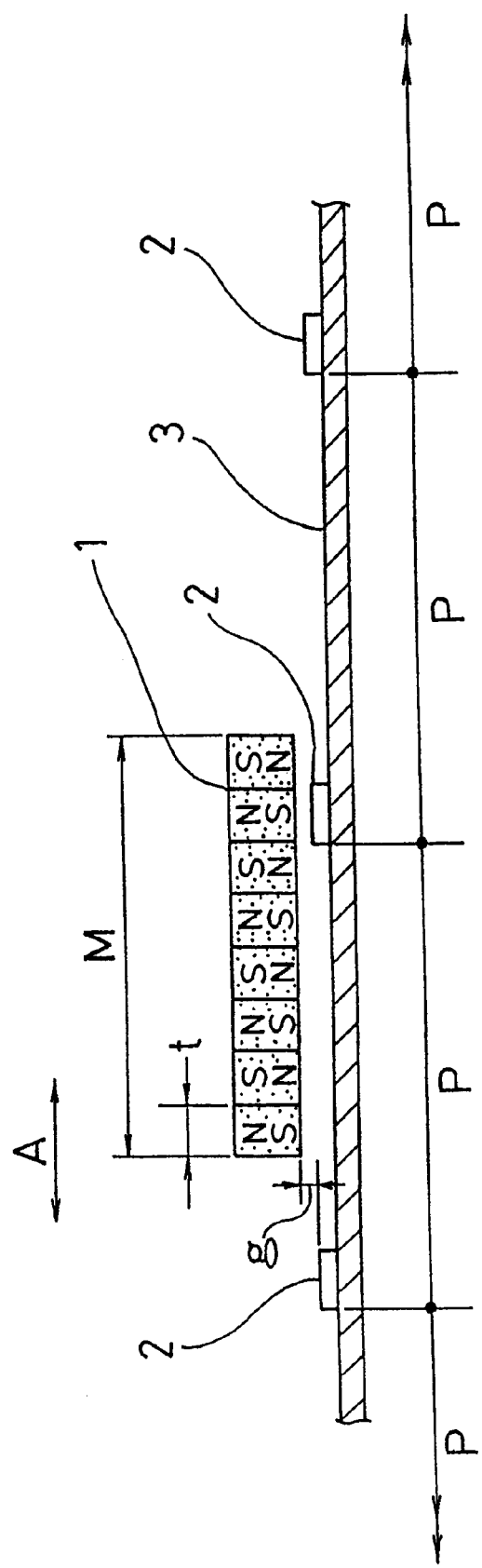
FIG. 1 is an explanation view of the enlarged principal part of a linear encoding device of the prior art.

Embodiments of linear encoding devices according to this invention will be described below, by referring to the drawings.

Figure 2:
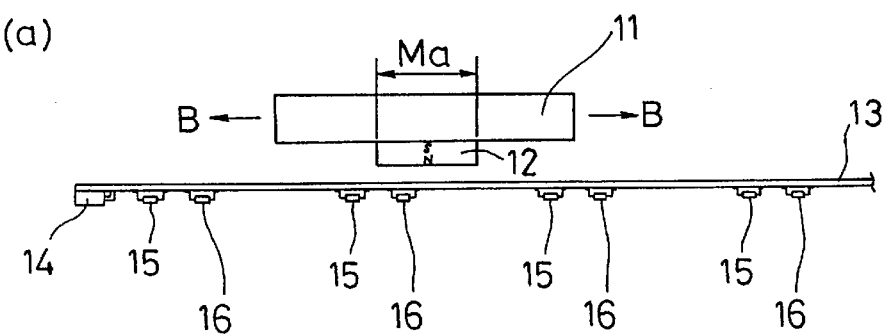
FIG. 2(a) is a front view of a linear encoding device.
FIG. 2(b) is a bottom view showing the state where the first Hall IC's and the second Hall IC's as detecting elements are arranged.
Figure 2:
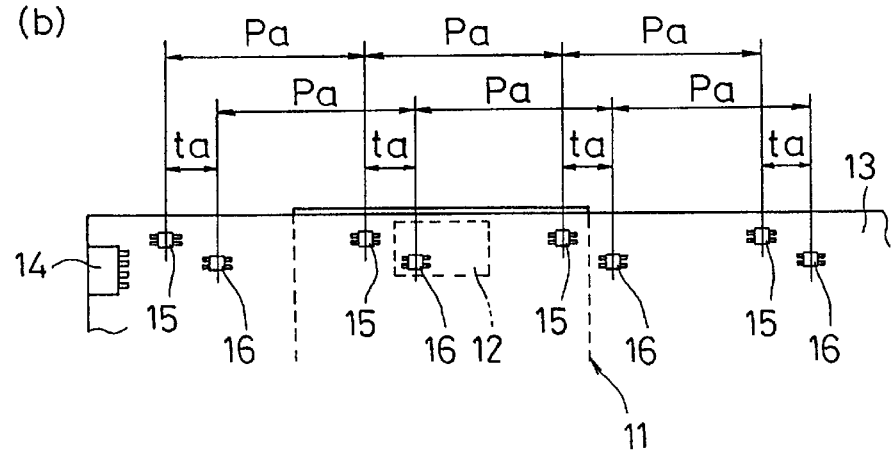
Figure 3:
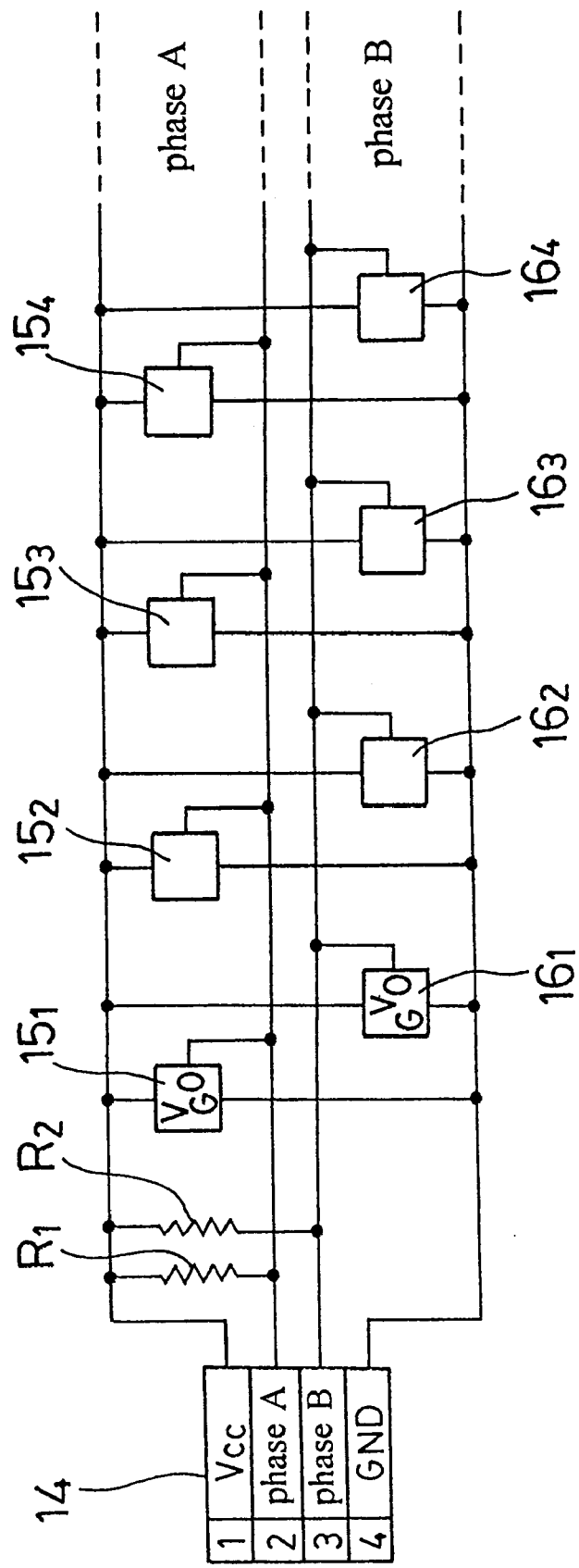
FIG. 3 is a wiring diagram of the first hall IC's and the second Hall IC's as detecting elements.
Figure 4:
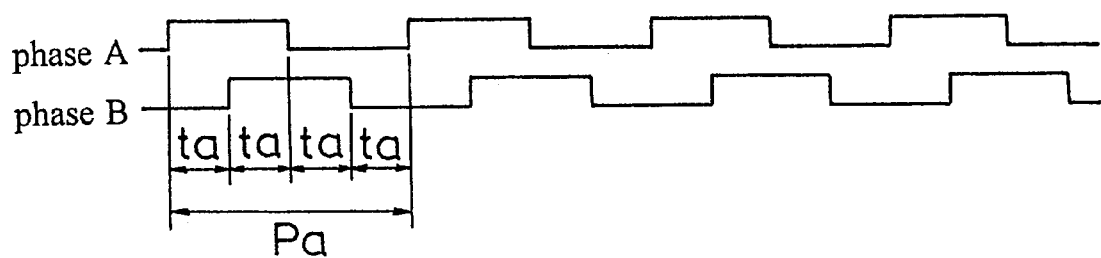
FIG. 4 is a figure showing the wave forms of phase A and phase B as the output signals of the first Hall IC and the second Hall IC.

FIG. 2 to FIG. 4 show a linear encoding device as the first embodiment, and FIG. 2(a) is a front view of the linear encoding device, and FIG. 2(b) is a bottom view showing the state where the first Hall IC's and the second Hall IC's as the detecting elements are arranged. FIG. 3 is a wiring diagram of the first Hall IC's and the second Hall IC's as the detecting elements. FIG. 4 is a figure showing the wave forms of phase A and phase B as the output signals of the first Hall IC's and the second Hall IC's.

As shown in FIG. 2, the linear encoding device of the present invention comprises: a rectangular board-like field magnet 12 as a detected element which is mounted under a table 11 on the movable side; a long rectangular board like base board 13 which is mounted on a long base stand (not shown in the figure) on the fixed side; and an output connector 14, and a plurality of phase A Hall IC's 15 and phase B Hall IC's 16 as detecting elements opposite to the field magnet 12, which are mounted under the base board 13.

As shown in FIG. 2(b), the Hall IC's 15, 16 mounted under the long rectangular board like base board 13 comprise first Hall IC's 15 arranged for each pitch Pa, that is, at equal pitches Pa in the longitudinal direction, and second Hall IC's 16 arranged at the equal pitches Pa in parallel to the first Hall IC's. The row of second IC's 16 are shifted relative to the row of first IC's 15 by a distance ta equal to a quarter of the pitch distance Pa, that is, the second Hall IC's 16 are shifted by a quarter of the pitch Pa which makes a phase difference of 90 degrees relative to the first Hall IC 15 in the longitudinal direction. Furthermore, the clearance of the parallel may be any clearance as long as the rows of Hall IC's 15, 16 are not overlapped, and a single line is also possible instead of two parallel.

The Hall IC's 15, 16 detect the magnetism, and include Hall elements and circuits which convert the outputs of the hole elements into the digital signals and output them, and as shown in FIG. 4, the detection signals are output as digital signals.

As shown in FIG. 2, the field magnet 12 as a detected element is mounted under the table 11 on the movable side which is slidably guided along the longitudinal direction B of the long base stand (not shown in the figure), and it is a single rectangular board like permanent magnet which is opposite to the Hall IC's 15, 16 arranged on the base board 13 mounted on the base stand without touching them, and which has a width covering the Hall IC's 15, 16 and a length Ma of a half of the pitch Pa making a phase of 180 degrees.

The relation among the first Hall IC's 15, second Hall IC's 16, and field magnet 12 is set, by first setting the pitch Pa of the first Hall IC's 15 and the second hall IC's 16 by a preferred positioning accuracy(to be described later), as follows:

$$ta=Pa/4, Ma=Pa/2$$

where ta is the phase difference between the first Hall IC 15 and the second Hall IC 16, and Ma is the length of the field magnet.

FIG. 3 is a wiring diagram of the first Hall IC's 15 and the second Hall IC's 16.

As shown in FIG. 3, $15_1, 15_2, 15_3, 15_4, \ldots$ as the first Hall IC's 15 respectively connect the terminals V and terminals G thereof with the power source terminal Vcc and GND of the connector 14 so that the power source may be supplied through the connector 14 from an external power source (not shown in the figure), and they respectively connect the output terminals O thereof with the output terminal (phase A) of the connector 14 so that the output signal of phase A as the detection signal may be output through the connector 14 to the counter circuit of a control device (not shown in the figure).

Furthermore, similarly, $16_1, 16_2, 16_3, 16_4, \ldots$ as the second Hall IC's 16 respectively connect the terminals V and terminals G thereof with the power source terminal Vcc and GND of the connector 14 so that the power source may be supplied through the connector 14 from an external power source (not shown in the figure), and they respectively connect the output terminals O thereof with the output terminal (phase B) of the connector 14 so that the output signal of phase B as the detection signal may be output through the connector 14 to the counter circuit of a control device (not shown in the figure).

Furthermore, between the power source terminal Vcc and the output terminal (phase A) and between the power source terminal Vcc and the output terminal (phase B) of the connector 14, a pull up resistance $R_1$ and a pull up resistance $R_2$ are connected.

Next, the action of the linear encoding device of the present invention will be described.

The linear encoding device of the present invention comprises, in a guiding device including a long base stand and a table slidably guided along the longitudinal direction of the base stand, a detected element mounted to the table and a detecting element mounted to the base stand, and it detects the position of the table on the movable side relative to the base stand on the fixed side.

The positional detection is performed as follows: as shown in FIG. 2(a), when the table 11 on the movable side moves, for example, rightward (or leftward), the field magnet 12 as the detected element mounted to the table 11 also moves in the same direction, and passes in turn over the Hall IC's 15, 16 as the detecting elements mounted to the opposite base board 13, and when the Hall IC's 15, 16 just face the field magnet 12, the magnetism of the field magnet 12 is detected and the detection signal is output, and therefore, by the movement of the field magnet 12, a continuous detection signal is output from the Hall IC's 15, 16 arranged at equal pitches Pa, and this output is input into the counter circuit of a control device (not shown in the figure) and is calculated.

Specifically, since the length Ma of the field magnet 12 is a phase of 180 degrees, that is, a half of the equal pitch Pa, the outputs of the detection signals are, by the movement of the field magnet 12, as shown in FIG. 4, made to be the wave form of the output of phase A output from the first Hall IC 15 and the wave form of the output of phase B output from the second Hall IC 16 having the phase difference ta of 90 degrees relative to the first Hall IC 15.

Then, since the detection signal is obtained as the digital signal, the counter circuit can perform the processing by the digital signal directly without performing the A/D conversion, and as shown in FIG. 4, a count is performed for each phase difference ta, and the position is calculated.

In that positional calculation, for example, if the pitch Pa is 8 mm, the phase difference between phase A and phase B is 2 mm, and the counter circuit counts the digital signal for every 2 mm, and counts 0, 2, 4, 6, 8, 10 . . . from the left, and the positional signal for each 2 mm and the distance of movement can be obtained. Furthermore, for example, if the pitch Pa is 40 mm, the phase difference between phase A and phase B is 10 mm, and the counter circuit counts the digital signal for every 10 mm, and counts 0, 10, 20, 30, 40, 50 . . . from the left, and the positional signal for every 10 mm and the distance of movement can be obtained.

Furthermore, in the discrimination of the direction of movement, as shown in FIG. 4, the digital signal of phase A is detected preceding by the phase difference ta when seen from the left side, and on the contrary, the digital signal of phase B is detected preceding by the phase difference ta when seen from the right side, so that the direction of movement of the table 11 can be discriminated by watching the rising of the phase A and phase B.

Moreover, by the output signal of the counter circuit and the clock signal in the control device, the movement speed of the table 11 can be found.

The positioning accuracy of the linear encoding device of the present invention is determined by the setting of the equal pitch Pa of the Hall IC's 15, 16, and the positional detection is performed for each phase difference ta, and therefore, if the phase difference ta is made to be approximately 2 mm as the minimum size and is made to be approximately 10 mm as the maximum size, it can usually be used and is effective, and it is made to be a specified size approximately from 2 mm to 10 mm depending on the service objects. Furthermore, in this positioning accuracy approximately from 2 mm to 10 mm, the equal pitch Pa of the Hall IC's 15, 16 is set to a specified size approximately from 8 mm to 40 mm by the above mentioned [ta=Pa/4].

In the linear encoding device of the present invention, the field magnet 12 comprises a single magnetic pole on each side of the magnet, top and bottom, and further, the Hall IC's 15, 16 output the digital signal of the output of the rectangular wave, and therefore, it is sufficient that the Hall IC's 15, 16 can sense at least the magnetism of the field magnet 12, so that the gap between the field magnet 12 and the Hall IC's 15, 16 may be a rough gap of approximately 1 mm~10 mm.

In the linear encoding device of the present invention, the digital signal is directly output, and it is unnecessary to perform a conventional A/D conversion and it is unnecessary to provide an A/D converter, and therefore, the load of the control device is small, and further, the arithmetic processing can also be performed at a high speed. Accordingly, even if the speed of the table 11 is, for example, a high speed of approximately 5~30 m/sec, to deal with that is possible.

Furthermore, in the linear encoding device of the present invention, it is sufficient that the Hall IC's 15, 16 are arranged at equal pitches Pa, and the wiring of the Hall IC's 15, 16 is also simple, and therefore, the device is optimum for a long positional measurement.

Furthermore, if the Hall IC's 15, 16 are mounted to the base board 13 in advance, the assembly can easily be performed even in the long device.

Next, by referring to FIG. 5, the second embodiment of the present invention will be described. This embodiment is an embodiment where the linear encoding device of the first embodiment is used for the linear motor table as the guiding device. In the following description, the parts having the same arrangement and function as the linear encoding device shown in FIG. 2, will be omitted because of the repetition of the description, and only the principal part will be described. The same reference numerals are given to the parts having the same arrangement and function as the linear encoding device shown in FIG. 2.

Figure 5:
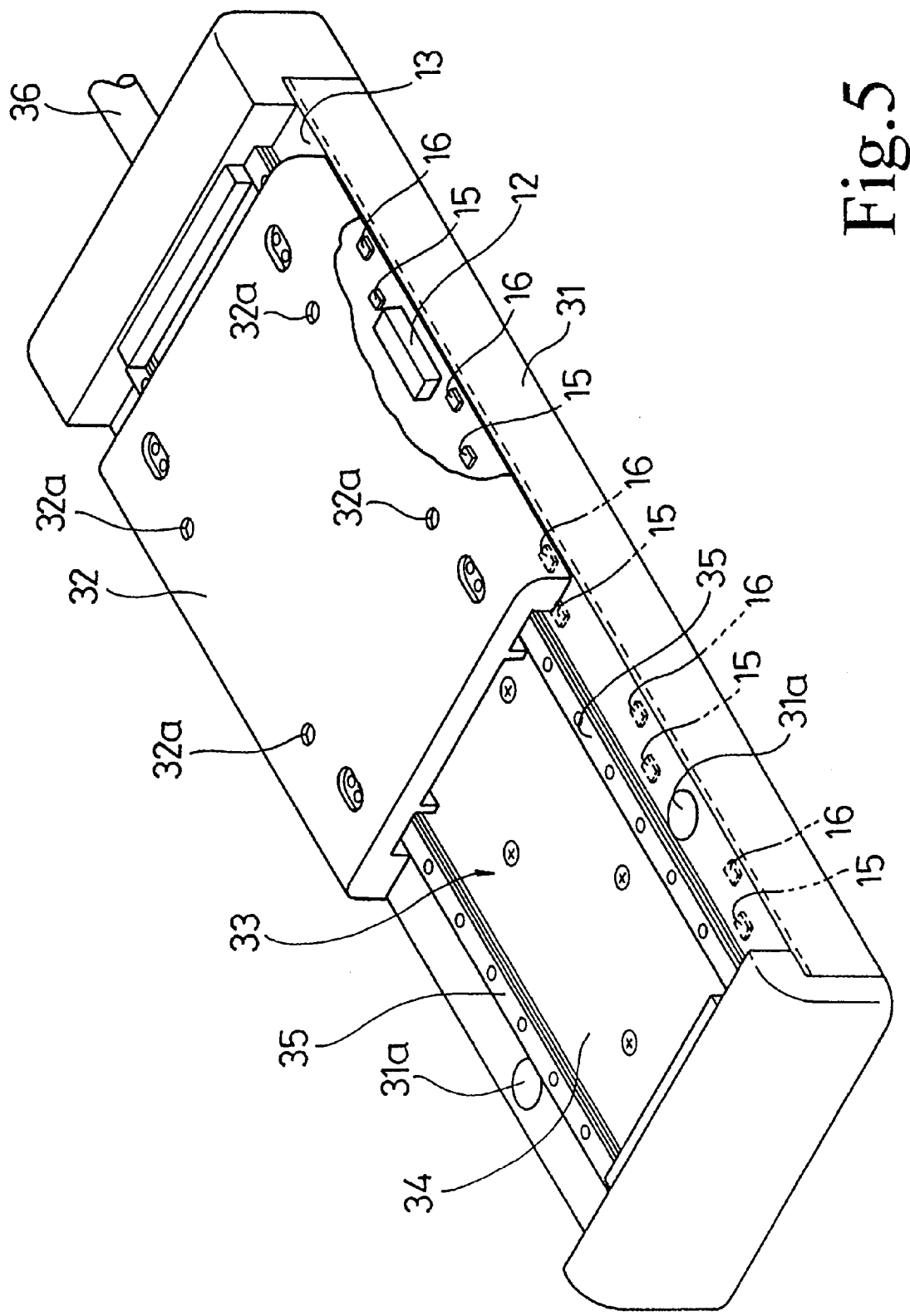
FIG. 5 is a perspective view, including a partial fracture of a linear encoding device applied to a linear motor table.

FIG. 5 is a perspective view, including a partially broken-away view of a linear encoding device applied to the linear motor table.

As shown in FIG. 5, this linear motor table mainly comprises: a bed 31 which is the long rectangular board like base stand on the fixed side; a slidable table 32 on the movable side which is guided by a linear motion rolling guiding unit along the longitudinal direction of this bed 31; a linear electromagnetic actuator 33 which drives the table 32 relative to the bed 31 in such a way that sliding and positioning are free; and a linear encoding device.

The bed 31 is fastened on the working stand of a machine tool or the like with bolts (not shown in the figure), by using a plurality of bolt insertion holes 31a formed along the longitudinal direction on both sides of the bed 31. Furthermore, the table 32 is used such that a driven body, for example, a piece to be worked is fastened to the screw holes 32a formed on the upper surface side.

The guiding means of the table 32 relative to the bed 31 comprises a linear motion rolling guiding unit, and it is arranged such that 2 pieces of track rails 35 having raceway grooves are mounted on the upper surface of the bed 31 in parallel on both sides, and 2 pieces of sliders (not shown in the figure) having raceway grooves opposite to the raceway grooves are mounted across each of these track rails 35 through rolling elements infinitely circulating between the raceway grooves, and these sliders are mounted in the concave portions at four corners on the lower surface side of the table 32 to support the table 32. By this guiding means, the table 32 is slidably and smoothly guided along the longitudinal direction of the bed 31.

Next, the linear electromagnetic actuator 33 which drives the table 32 to slide and to be positioned relative to the bed 31.

In the present embodiment, this linear electromagnetic actuator comprises a movable magnet type line ir direct current motor.

The primary side which is the feed si e of the movable magnet type linear direct current motor, comprises a coil base board 34 shown in FIG. 5 and armature coils not shown in the figure) which are arranged in a line along he direction of movement of the table 32 and are adhered onto he lower surface side of this coil base board 34. Furthermore, the coil base board 34 and the armature coils are mounted in the concave portions through the total length in the longitudinal direction on the upper surface side of the bed 31.

On the other hand, the secondary side of the linear direct current motor comprises a multipolar field magnet (not shown in the figure) which is attached on the lowe surface side of the table 32, opposite to the armature coils.

This multipolar field magnet is shaped like a rectangular board, and is magnetized such that a plurality of magnetic poles N, S are alternately arranged along the sliding direction of the table 32.

In the linear direct current motor, by the arrangement of the primary side and the secondary side, a thrust based on the Fleming's left hand rule is generated be -ween the bed 31 and the table 32, and the table 32 is driven relative to the bed 31.

Next, as shown in FIG. 5, in this linear motor table, the linear encoding device of the first embodiment is arranged at the portion where the bed 31 faces the table 32, as a detection means for the detection of the relative position of the table 32 to the bed 31 and for the discrimination f the direction of movement.

In this linear encoding device, the coil base board 13 to which the Hall IC's 15, 16 are mounted, is arranged along the longitudinal direction of one side upper surface of the bed 31, and the fieldmagnet 12 is mounted onto the side lower surface of the table 32, opposite to the Hall IC's 5, 16.

In the linear motor table, the present position of the table 32 is detected at all times on the basis of the signal from the linear encoding device as a detection means, and the table 32 can be moved to any position and ca be positioned.

Furthermore, taking out of the signal from the Hall IC's 15, 16 of the linear encoding device, feeding to the armature coils of the linear motor table, and the like are performed by connecting the cable 36 attached to the end portion of the bed 31, to the external control device and power supply device.

This linear motor table acts such that when the operator operates an operating switch or the like an operation command is issued from the control device, the able 32 stopping at an arbitrary position moves toward the reference position on one end side of the operating stroke (on the right end side in FIG. 5), and when the table 32 reaches the reference position, the counter in the counter circuit is reset by the signal of the reference position from the home position signal sensor, and the table 32 moves to a specified position according to a specified program. Furthermore, the control of the position and direction of movement of the table 32 is performed on the basis of the signal from the Hall IC's 15, 16.

This linear motor table to which the linear encoding device is mounted, is arranged such that the multipolar field magnet of the linear electromagnetic actuator and the field magnet 12 are mounted onto the table 32, and therefore, it has no cable for the power source and for the signal on the movable side, and it can deal with a high speed, differently from the conventional type.

The linear encoding device of the present invention has such a simple arrangement that a plurality of Hall IC's with a specified equal pitch Pa and a phase difference ta, and a field magnet of a single magnetic pole with a specified length Ma are arranged, and therefore, it is most suitable for the long and high speed guiding device.

Furthermore, in the linear encoding device of the present invention, the digital signal is directly output, and it is unnecessary to perform a conventional A/D conversion, and it is unnecessary to provide an A/D converter, and therefore, the load of the control device is small, and further, the arithmetic processing can be performed at a high speed, and consequently, the device is most suitable for the simple and high speed guiding device.

Furthermore, in the linear encoding device of the present invention, it is sufficient that the Hall IC's 15, 16 can sense the magnetism of the field magnet 12, and therefore, the accuracy of the gap between the field magnet 12 and the Hall IC's 15, 16 maybe rough, and consequently, the device can easily be mounted to various types of the guiding devices.

What is claimed is:

1. A linear encoding device of a guiding device including a long base stand and a table slidably guided along a longitudinal direction of said base stand, the linear encoding device comprising a detected element mounted to said table and a detecting element mounted to said base stand, wherein:

said detecting element comprises a plurality of Hall IC's;

said Hall IC's comprise first Hall IC's arranged at equal pitches in said longitudinal direction and second Hall IC's arranged at said equal pitches in line or in parallel with said first Hall IC's, the second Hall IC's being shifted in the longitudinal direction by a quarter of said pitch relative to said first hall IC's, corresponding to a phase difference of 90 degrees to said first Hall IC's in said longitudinal direction;

said detected element comprises a rectangular board-like field magnet wherein a single magnetic pole thereof faces toward said Hall IC's, and having a length of a half of said pitch corresponding to a phase of 180 degrees, whereby said Hall IC's detect said field magnet and output signals of a phase A corresponding to the first Hall IC's and a phase B corresponding to the second Hall IC's.

2. The linear encoding device according to claim 1, wherein said Hall IC's are mounted onto said base stand through a base board.

3. The linear encoding device according to claim 1, wherein said pitch is approximately from 8 mm to 40 mm.

4. The linear encoding device, according to claim 1 wherein said guiding device includes a linear motor table comprising:

a long rectangular board like bed;

a slidable table which is guided by a linear motion rolling guiding unit along the longitudinal direction of said bed; and a movable magnet linear electromagnetic actuator which drives said table in such a way that sliding and positioning are free, relative to the bed.

* * * * *